US006707039B1

(12) United States Patent
Truche et al.

(10) Patent No.: US 6,707,039 B1
(45) Date of Patent: Mar. 16, 2004

(54) AP-MALDI TARGET ILLUMINATION DEVICE AND METHOD FOR USING AN AP-MALDI TARGET ILLUMINATION DEVICE

(75) Inventors: Jean-Luc Truche, Los Altos, CA (US); Jian Bai, Mountain View, CA (US); Kevin P. Killeen, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 8 days.

(21) Appl. No.: 10/246,997

(22) Filed: Sep. 19, 2002

(51) Int. Cl.[7] .............................................. H01S 49/00

(52) U.S. Cl. ....................................... 250/288; 250/282

(58) Field of Search .................................. 250/281–300

(56) References Cited

U.S. PATENT DOCUMENTS 4,204,117 A * 5/1980 Aberle et al. ............... 250/287
5,640,010 A 6/1997 Twerenbold
5,663,561 A 9/1997 Franzen et al.
5,777,324 A 7/1998 Hillencamp
5,917,185 A 6/1999 Yeung et al.
5,965,884 A * 10/1999 Laiko et al. ................ 250/288
5,969,350 A 10/1999 Kerley et al.
5,994,694 A * 11/1999 Frank et al. ................ 250/281
6,040,575 A 3/2000 Whitehouse et al.
6,140,639 A 10/2000 Gusev et al.
6,175,112 B1 1/2001 Karger et al.
6,444,980 B1 * 9/2002 Kawato et al. ............. 250/288
2002/0175278 A1 * 11/2002 Whitehouse ................ 250/281
2003/0052268 A1 * 3/2003 Doroshenko et al. ....... 250/288
2003/0160165 A1 * 8/2003 Truche et al. ............... 250/288

* cited by examiner

*Primary Examiner*—John R. Lee
*Assistant Examiner*—James P. Hughes

(57) ABSTRACT

An atmospheric pressure MALDI (AP-MALDI) apparatus and method are disclosed wherein a laser beam is reflected from a surface on an ion transfer interface between an analyte target and a mass analyzer. After reflection, the laser beam irradiates the target, which may be disposed on a target substrate. An embodiment includes using a reflective surface on the interface also for viewing the target and, e.g., by means of signals from a processor, adjusting the relative position of the target substrate and the laser beam. The apparatus can also be operated at pressures that are less than or greater than atmospheric.

44 Claims, 9 Drawing Sheets

AP-MALDI TARGET ILLUMINATION DEVICE AND METHOD FOR USING AN AP-MALDI TARGET ILLUMINATION DEVICE

FIELD OF THE INVENTION

The present invention relates to mass spectrometry devices and, more particularly, a target illumination device for use in Matrix Assisted Laser Desorption/Ionization mass spectrometry.

BACKGROUND INFORMATION

Mass spectrometry is a powerful analytical tool in identifying molecular components. Mass spectrometry is a means of identifying these molecular components according to their characteristic "weight" or mass-to-charge ratio. Typically, a mass spectrometer includes the following components: an optional device to introduce the sample to be analyzed (this sample is referred to hereinafter as the "analyte"), such as a liquid or gas chromatograph, direct insertion probe, syringe pump, autosampler, etc.; an ionization source which produces ions from the analyte; an analyzer which separates the ions according to their mass-to-charge ratio; a detector which measures the abundance of the ions; and a data processing system that produces a mass spectrum of the analyte.

Conventionally, various ionization sources, employing various ionization methods, are utilized in order to produce ions from the analyte. One of these ionization methods is referred to as electrospray, in which a sample of the analyte in a solvent is nebulized into aerosol droplets and electric fields induce a charge on the aerosol droplets. The charged aerosol undergoes an ion evaporation process whereby desolvated analyte ions are produced and enter the mass spectrometer for analysis Other conventional ionization techniques include atmospheric pressure chemical ionization and atmospheric pressure photo-ionization.

Each of these ionization techniques is suited to different classes of molecular species. However, for the mass analyzation of macromolecules, including polymer molecules, bio-organic molecules (e.g., peptides, proteins, oligonucleotides, oligosaccharides, DNA, RNA, etc.) and small organisms, e.g., bacteria, the generally preferred method of ionization is matrix-assisted laser desorption ionization (referred to hereinafter as "MALDI"). According to the MALDI method of ionization, the analyte is mixed in a solvent with small organic molecules having a strong absorption at a particular laser wavelength (hereinafter referred to as the "matrix"). The solution containing the dissolved analyte and matrix is applied to a metal probe tip or target substrate. As the solvent evaporates, the analyte and matrix co-precipitate out of solution to form a solid solution of the analyte in the matrix on the target substrate. The co-precipitate is then irradiated with a short laser pulse inducing the accumulation of a large amount of energy in the co-precipitate through electronic excitation or molecular vibration of the matrix molecules. The matrix dissipates the energy by desorption, carrying along the analyte into the gaseous phase. During this desorption process, ions are formed by charge transfer between the photo-excited matrix and the analyte.

Conventionally, the MALDI technique of ionization is performed using a time-of-flight analyzer, although other mass analyzers such as an ion trap, an ion cyclotron resonance mass spectrometer and quadrupole time-of-flight are also used. These analyzers, however, must operate under high vacuum, e.g., less than $1\times10^{-5}$ torr, which, among other disadvantages, may limit sample throughput, reduce resolution and capture efficiency, and make testing samples more difficult and expensive to perform.

To overcome these disadvantages, a technique referred to as atmospheric pressure matrix-assisted laser desorption ionization (hereinafter referred to as "AP-MALDI") has been developed, which employs the MALDI technique of ionization at atmospheric pressure. The MALDI and the AP-MALDI ionization techniques have much in, common, e.g., both techniques are based on the process of pulsed laser beam desorption/ionization of a solid-state target material resulting in production of gas phase analyte molecular ions. However, the AP-MALDI ionization technique does not require the ionization process to occur in a vacuum.

Several apparatus configurations that employ the AP-MALDI ionization technique are illustrated in U.S. Pat. No. 5,965,884 to Laiko (hereinafter referred to as "the Laiko patent"). FIG. 10 (which corresponds to FIG. 1 of the Laiko patent) illustrates an AP-MALDI apparatus having an ionization chamber connected to a spectrometer via an interface. The interface has an inlet orifice into the spectrometer. A sample support extends into the ionization chamber and has a target substrate which is positioned adjacent and orthogonal to a central axis of the inlet orifice. A laser directs a laser beam orthogonally to the target substrate so as to focus on samples deposited on the target substrate, thereby heating and causing the desorption of the sample. The resulting plume of ionized analyte molecules enters the inlet orifice of the spectrometer by virtue of a potential difference established between the target substrate of the sample support and the inlet orifice of the interface.

FIG. 11 (which corresponds to FIG. 5 of the Laiko patent) illustrates another AP-MALDI apparatus which employs a mirror to direct the laser beam onto the target substrate of the sample support. In this AP-MALDI apparatus configuration, the target substrate is orthogonal to the central axis of the inlet orifice of the mass spectrometer. The laser is positioned so that the direction of the laser beam is roughly parallel to the central axis of the inlet orifice. The mirror is positioned to one side of the target substrate and adjacent to the interface, such that it re-directs the laser beam at an acute angle onto a region of the target substrate which faces, and which is directly in front of, the inlet orifice.

However, none of the foregoing techniques produce and collect ions from an AP-MALDI ionization source with satisfactory efficiency. For instance, the apparatus illustrated in FIG. 10 discloses a target which, upon being struck by the laser beam, requires the ionized analyte molecules to travel parallel to the target substrate to reach the inlet orifice, reducing the collection efficiency of the ions. While the apparatus illustrated in FIG. 11 avoids this disadvantage by disclosing an orthogonal arrangement of the target substrate relative to the central axis of the inlet orifice, this arrangement has further disadvantages. For instance, the acute angle at which the laser beam strikes the target substrate does not provide optimal absorption of the laser energy by the target. These, and many other, disadvantages are discussed in greater detail below. Thus, there is a need for an improved method and apparatus for efficiently producing and collecting ions in an AP-MALDI apparatus.

SUMMARY OF THE INVENTION

The present invention, in accordance with various embodiments thereof, is directed to an AP-MALDI apparatus for ionizing a target for analysis in a mass analyzer. The apparatus may, according to one embodiment of the present invention, include a chamber, which may be also be called an ionization chamber, that is at or near atmospheric pressure and that contains the target. Pressure in the chamber can also be above or below atmospheric pressure. Thus, it should be understood that, while the term "AP-MALDI" is often used herein to refer to the apparatus, the present invention, according to various embodiment thereof, may employ pressures other than atmospheric pressure. The apparatus may also includes a target substrate, which, if an ionization chamber is employed, may be disposed within the ionization chamber. The target substrate has disposed thereon a target e.g., an analyte and corresponding matrix. In addition, the apparatus includes a laser beam produced by a laser, and has an interface between the target and the mass analyzer. The interface has an inlet orifice leading to the mass analyzer. A reflective surface is associated or integral with the interface assembly, and reflects the laser beam toward the target.

According to one example embodiment, the interface is a capillary, and the reflective surface is disposed on an end of the capillary. According to another example embodiment, the interface includes a cap configured to fit on an end of the capillary, and the reflective surface is disposed on the cap. According to still another example embodiment, the end of the capillary is shaped, and the cap is arranged so as to fit on the shaped end of the capillary. According to these and other various embodiments, the present invention enables the AP-MALDI apparatus to maintain the target substrate as close to, and as nearly orthogonal to, a central axis of the inlet orifice as possible, while simultaneously enabling the laser beam to impinge upon the target substrate as nearly orthogonal to the target substrate as possible. In addition, optical leverage is reduced, leading to less critical adjustment tolerances.

The present invention, in accordance pith various embodiments thereof, is also directed to a method for ionizing a target for analysis in a mass analyzer, the mass analyzer having, an interface that defines an inlet orifice of the mass analyzer. The method includes the steps of reflecting, a laser beam off a reflective surface integral with the interface and irradiating the target with the laser beam after reflection. Advantageously, the target is disposed on a target substrate, and the method further includes the step of positioning the target substrate so as to be substantially orthogonal to a central axis of the inlet orifice. In addition, the method may comprise the step of positioning the target substrate with respect to the reflected laser beam in response to a signal from a processor. According to one embodiment of the present invention, the step of irradiating the target includes striking the target with the laser beam such that the laser beam at the target substrate is substantially orthogonal to the target substrate.

DETAILED DESCRIPTION

As previously mentioned, the present invention is directed to a MALDI apparatus, and preferably an AP-MALDI apparatus, which provides improved ion production and collection efficiency as compared to conventional AP-MALDI apparatuses. FIGS. 1A through 9, each of which is discussed in greater detail below, illustrate various embodiments of the present invention, whereby a laser beam impinges on a target, e.g., a sample to be analyzed, disposed on a target substrate.

Figure 1B:
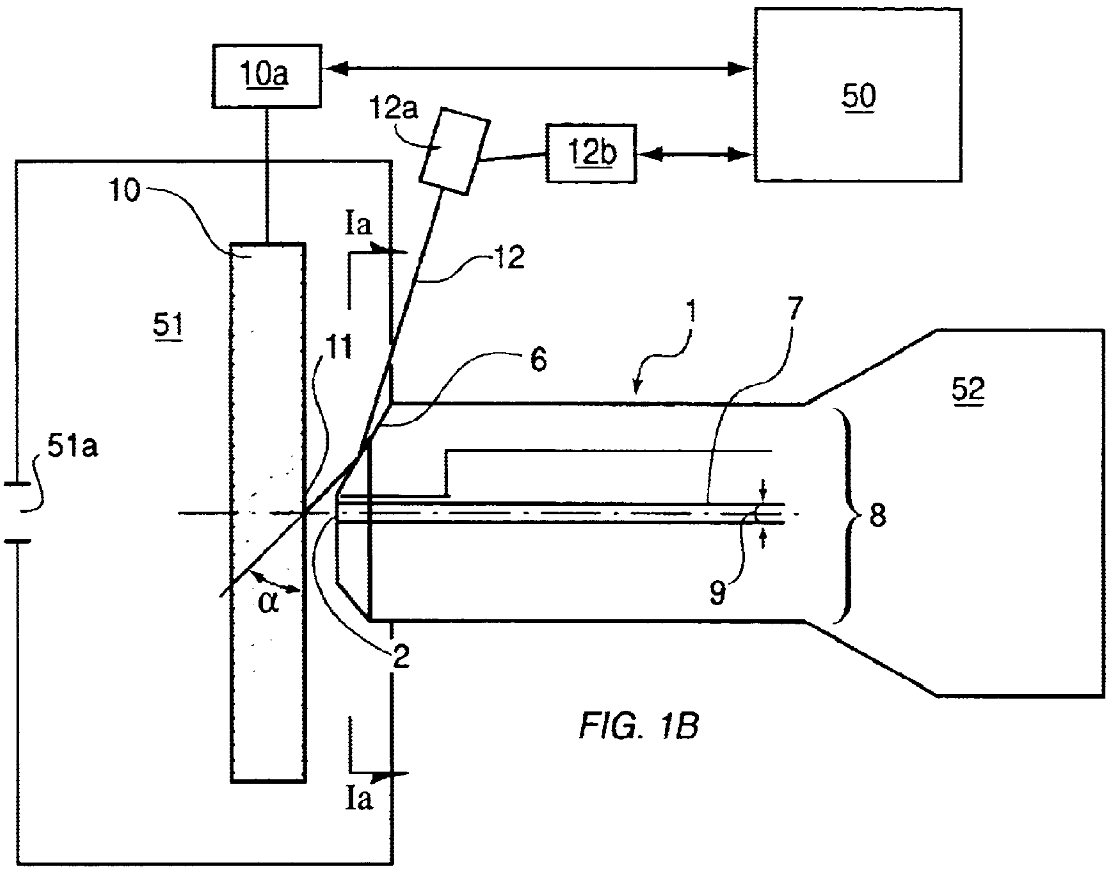
FIGS. 1A and 1B illustrate a device, according to an example embodiment of the present invention, having a flat reflective surface on an end of a capillary.
Figure 1A:
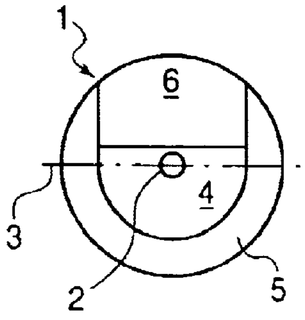

FIGS. 1A and 1B illustrate one example embodiment of the present invention. FIG. 1B illustrates a side-view cross-sectional schematic representation of an interface, in this case a capillary 1, with a capillary bore 7 disposed therethrough and leading to a mass spectrometer 52. The capillary 1 has a capillary width 8, while the capillary bore 7 has a bore width 9. In the specific embodiment shown, the capillary width 8 may be about 6.4 millimeters and the bore width 9 may be about 0.6 millimeters, although other dimensions, both larger and smaller, are possible for both the capillary width 8 and the bore width 9. The capillary 1 has an inlet orifice 2 arranged adjacent to a target substrate 10. In the particular embodiment shown, the capillary 1 and the capillary bore 7 are arranged orthogonal to the target substrate 10. Alternatively, the capillary 1 and the capillary bore 7 may be arranged at an angle other than 90 degrees with respect to target substrate 10, said angle being, by way of example and not limitation, between about 45 degrees and about 135 degrees (for instance, referring to FIG. 9, there is shown one embodiment of the present invention, wherein the target substrate 10 is non-orhogonally positioned relative to the capillary 1 and the capillary bore 7, e.g., at an angle β of about 45°). The target 11 is preferably arranged on the target substrate 10 at a point opposite the central axis of the capillary bore 7, though alternatively, the target 11 may be arranged at another point on the target substrate 10.

FIG. 1A illustrates an end-un view of the capillary 1 illustrated in FIG. 1B, taken along the lines 1*a*—1*a*. The capillary 1 is shown having the inlet orifice 2. The center line 3 in FIG. 1A illustrates a center line through the capillary 1 and includes the central axis of the inlet orifice 2. Surrounding the inlet orifice 2 is a front face 4, which is in turn partially surrounded by a beveled edge 5. Above the center line 3 is a reflective, e.g., mirror, surface 6, which extends from a point above the inlet orifice 2 to the edge of the capillary 1. Alternatively, the reflective surface 6 may have a lower edge tangential to the inlet orifice 2. The reflective surface 6 may be a polished stainless steel surface, a dielectric mirror surface, or any other appropriate, e.g., heat resistant and reflective in the selected wavelengths, surface. According to the present invention, the reflective surface 6 is integral with the capillary 1, such that the reflective surface 6 is formed as part of the capillary 1, or, as is shown and described below in connection with other embodiments of the present invention, the reflective surface 6 is disposed relative to the capillary 1 so as to form a unit therewith.

The capillary 1 may be constructed of any conductive material, such as stainless steel, or of any appropriate dielectric material, such as glass or quartz. The target substrate 10 is also made of any appropriate metal or dielectric material, and in one example embodiment is made of stainless steel. In the specific embodiment shown, the target substrate 10 has a thickness of about 1.0 millimeter, though any thickness is conceived. The target 11 is an analyte embedded in a light absorbing matrix. The matrix, material is chosen so that it ionizes when a selected wavelength, in the form of a laser beam 12, impinges on the target 11. A laser 12*a* emits a laser beam 12 which reflects off the reflective surface 6 onto the target 11 on the target substrate 10. When light in the wavelength of the laser beam 12 impinges on the target 11, the light absorbing material is ionized and evaporated. The laser beam 12 impinges on the target 11 at an angle designated as angle α. Angle α is shown as being about 45 degrees, but may also be more or less than 45 degrees, and is preferably as close to 90 degrees as possible, as is explained below.

The analyte may be ionized by a charge transfer process with the ions from the matrix material. The analyte ions and matrix ions form a plume of material from target 11. The ionization of the target 11, or portions of the target 11, occurs at or near atmospheric pressure, but in some embodiments may occur at substantially lower than atmospheric pressure. Pressure greater than atmospheric, up to about two atmospheres, can also be useful. The capillary bore 7 may lead to a mass spectrometer. A gas pressure differential may exist between the mass spectrometer and the region in which the ionization of the target 11 occurs, thereby causing the plume of ions produced at the target 11 to pass into the inlet orifice 2. Additionally, a DC bias, usually but not necessarily over 1 kV, may be applied between the front face 4 and the target substrate 10 to help induce the ions to move in the direction of the inlet orifice 2. These ions then move through the capillary bore 7 to the mass spectrometer for analysis.

FIG. 1B also illustrates a target substrate adjustment mechanism 10*a*, which, as is explained in more detail below, may include robotics or the like to adjust the position of the target substrate 10. The target substrate adjustment mechanism 10*a* may be configured to adjust the position of the target substrate 10 within the plane defined by the target substrate 10, within a direction that is orthogonal to the plane defined by the target substrate 10, or in any other direction or manner desired. As explained below, this adjustment may enable the AP-MALDI apparatus of the present invention, according to various embodiments thereof, to illuminate, and thus analyze, more than one target 11 disposed on the target substrate 10.

FIG. 1B also illustrates a laser adjustment mechanism 12*b*, which may be configured to adjust the position or orientation of the laser 12*a*. By changing the position or orientation of the laser 12*a*, the AP-MALDI apparatus of the present invention, in accordance with various embodiments thereof, may change the angle at which the laser beam 12 is reflected off of the reflective surface 6, the point at which the laser beam 12 is reflected off of the reflective surface 6, or the location at which the laser beam 12 impinges the target substrate 10. Thus, it may be possible by adjusting the position or orientation of the laser 12*a* to illuminate, and thus analyze, more than one target 11 disposed on the target substrate 10 even if the target substrate is maintained stationary.

Although FIG. 1B illustrates the target substrate adjustment mechanism 10*a* and the laser adjustment mechanism 12*b*, it is recognized that, according to various embodiments, the AP-MALDI apparatus of the present invention may include any number of these mechanism or else may include none of these mechanisms, depending on the desired adjustability of the system. Each of the target substrate adjustment mechanism 10*a* and the laser adjustment mechanism 12*b* is illustrated as being coupled to a processor 50. The processor 50 is configured to receive data such as from a video system (discussed in greater detail below), to process the received data, and to control the adjustment of the target substrate adjustment mechanism 10*a* and the laser adjustment mechanism 12*b* in accordance therewith.

These control features, e.g., the adjustment mechanisms 10*a* and 12*b*, and the processor 50, while optional to the system of the present invention, improve the throughput of the AP-MALDI by enabling more than one target 11 to be disposed and subsequently analyzed on the target substrate 10, or for the individual parts of a target to be analyzed. It is noted that these features, while illustrated in FIG. 1B only, may be employed in any of the embodiments illustrated in FIGS. 1A through 9. Furthermore, for the purposes of clarity, only FIG. 1 illustrates the ionization chamber 51 in which the target substrate may be disposed and the mass spectrometer 52 into which the inlet orifice of the capillary leads, though it is understood that the features illustrated in FIGS. 1A through 9 may be employed with these components of the conventional AP-MALDI apparatus. In the embodiment shown in FIG. 1B, the ionization chamber 51 has a gas inlet opening 51*a* which permits a flow of gas to be introduced into the ionization chamber 51, thereby maintaining the ionization chamber at or near atmospheric pressure despite the presence of a high vacuum in the mass spectrometer 52 on the opposite side of the inlet orifice 2. Alternatively, no actual ionization chamber need be used. In addition, while each of the FIGS. 1A to 9 illustrate a capillary having an inlet orifice, it is understood that the inlet orifice of the mass spectrometer may be any known type of inlet opening or orifice, not merely the inlet orifice of a capillary, and that the present invention is not intended to be limited in this regard.

Figure 1C:
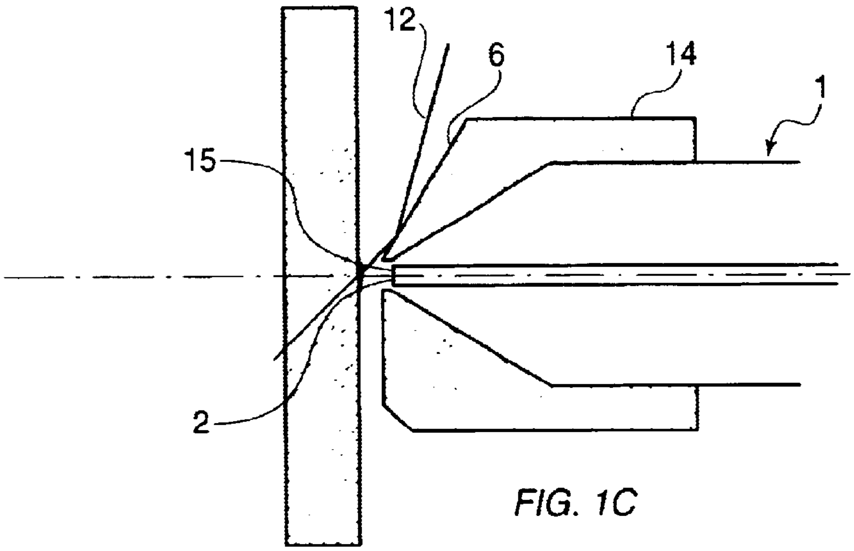
FIG. 1C illustrates a device, according to an example embodiment of the present invention, having a flat reflective surface on an end of a capillary cap.

FIG. 1C illustrates another example embodiment of the present invention. More specifically, FIG. 1C illustrates a reflective surface similar to that in FIG. 1A, but with the reflective surface 6 disposed on a capillary cap 14 surrounding the end of the capillary 1. The capillary cap 14 has a slip-fit arrangement with the front face 4 of a capillary (not shown) and can be interchangeably placed over the end of the capillary. The capillary cap 14 has a cap opening 15 which is in alignment with the inlet orifice of the capillary 1 when the capillary cap 14 is placed over a front face of the capillary. One advantage of using the capillary cap 14, as compared to the embodiment illustrated in FIGS. 1A and 1B, is that the reflective surface 6 may be formed in the desired shape without the risk of damaging the inlet orifice 2 or the capillary 1. Additionally, using the capillary cap 14 as the surface to mount the reflective surface 6 allows different reflective materials and different reflective shapes to be used with the same capillary 1. The capillary cap 14 may be made of any conductive or dielectric material, e.g., stainless steel and glass.

Figure 1D:
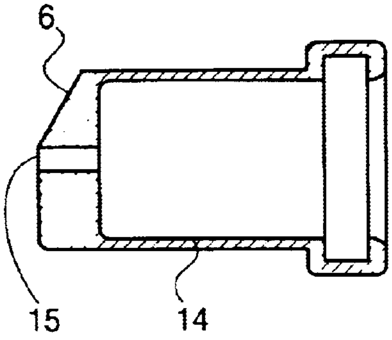
FIGS. 1D and 1E illustrate a device, according to an example embodiment of the present invention, having a flat reflective surface on an end of an extended capillary cap.
Figure 1E:
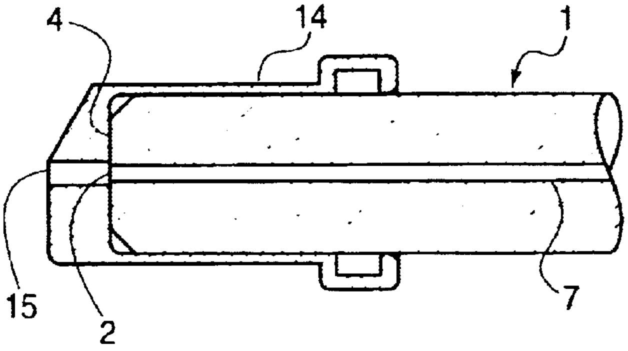

FIGS. 1D and 1E illustrate still another example embodiment of the present invention. More specifically, FIG. 1D illustrates a flat reflective surface incorporated into the capillary cap 14, wherein the capillary cap 14 is configured so as to extend significantly beyond the original point of the inlet orifice 2 in the direction of a target in front of the capillary. This extended cap configuration allows reflective surface 6 to be ground into capillary cap 14 without also grinding or adjusting the shape of the front face of the capillary 1.

FIG. 1E illustrates the extended capillary cap 14 of FIG. 1D shown arranged on the capillary 1. In one embodiment, the end of the capillary 1 is squared. The shape of the end of the capillary 1 mates with, or is compatible with, the shapes of the corresponding internal surfaces of the capillary cap 14. Any suitable and convenient shapes may be used for these surfaces. The cap opening 15 is shown with an internal diameter slightly larger than the diameter of the capillary bore 7. Therefore, there is shown a slight discontinuity at the interface between the cap opening 15 and the inlet orifice 2. For example, in an exemplary embodiment of the illustrated configuration, the cap opening 15 has an internal diameter of 1 millimeter and the capillary bore 7 has a diameter of 0.6 millimeters. Alternatively, the cap opening 15 may have an internal diameter of 0.6 millimeters thereby reducing or preferably eliminating the discontinuity at the interface between the capillary cap 14 and the capillary 1.

Figure 2A:
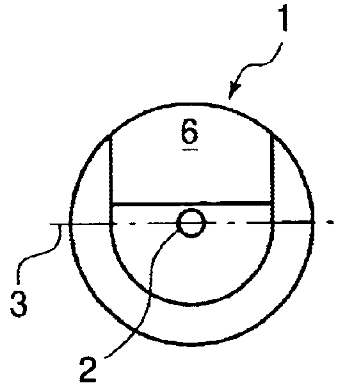
FIGS. 2A and 2B illustrate a device according to an example embodiment of the present invention having a parabolic reflective surface on an end of a capillary.
Figure 2B:
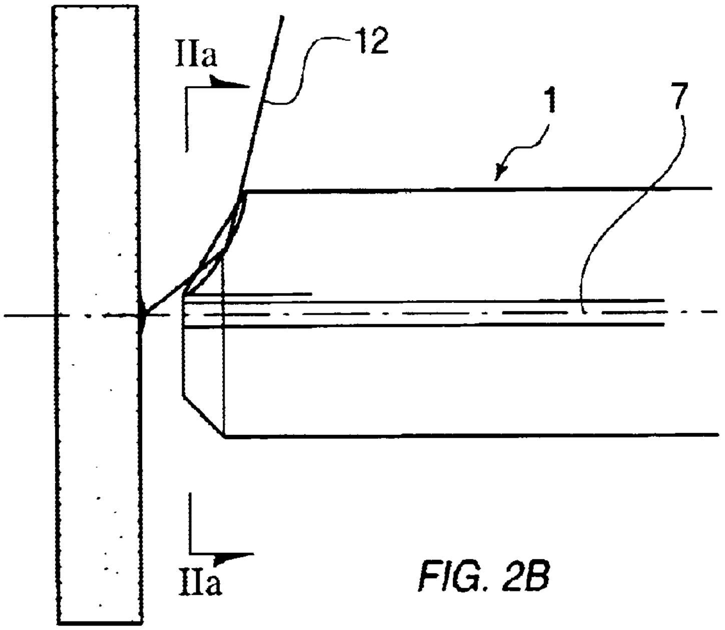

FIGS. 2A and 2B illustrate still another example embodiment of the present invention. More specifically, FIG. 2B illustrates a side-view cross-sectional schematic representation of a capillary 1 with a capillary bore 7. The embodiment illustrated in FIG. 2B is similar to the embodiment illustrated in FIG. 1B, except that the reflective surface 6 is parabolically shaped in FIG. 2B. In the embodiment illustrated in FIG. 2B, the laser beam 12 is reflected on the reflective surface 6 so as to impinge on the target 11 at an angle relative to a plane defined by the target substrate 10, which is about 45 degrees. However, upon adjustments to the position of the laser 12*a* or to the parabolic shape of the reflective surface 6, the laser beam may be reflected so as to impinge on the target 11 at an angle relative to the plane defined by the target substrate 10 which is larger or smaller than 45 degrees, and is preferably as close as possible to 90 degrees relative to the plane defined by the target substrate 10. FIG. 2A illustrates an end-on view of the capillary 1 illustrated in FIG. 2B, taken along lines 2*a*—2*a*. The capillary 1 is shown with an inlet orifice 2 and center line 3. The embodiment illustrated in FIG. 2A is similar to the embodiment illustrated in FIG. 1A, except that the reflective surface 6 is parabolically shaped in FIG. 2A. A parabolically shaped mirror may result in an improved focus of the laser beam on the target.

Figure 2C:
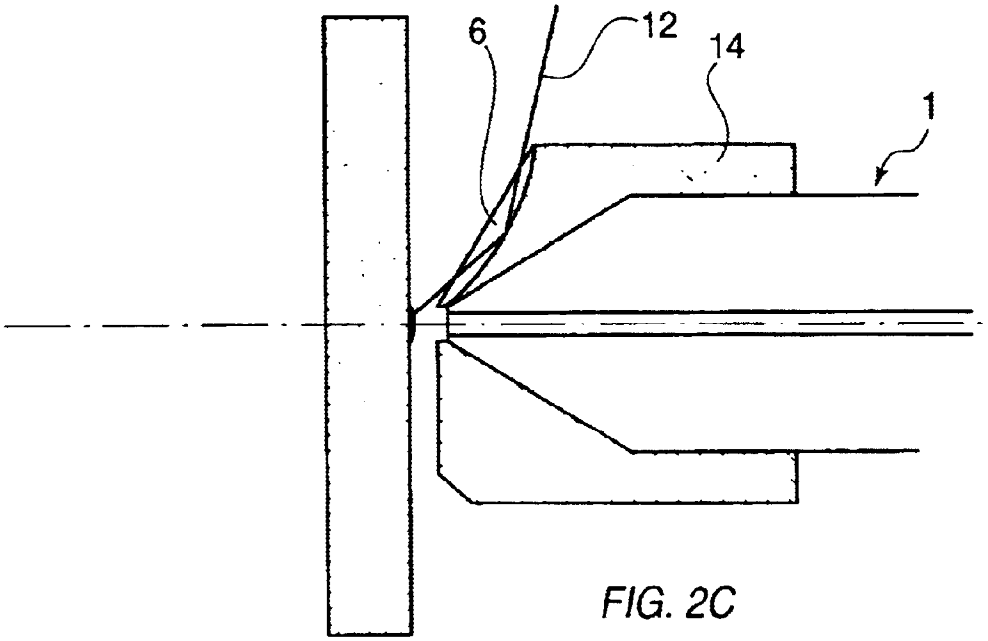
FIG. 2C illustrates a device according to an example embodiment of the present invention having a parabolic reflective surface on an end of a capillary cap.

FIG. 2C illustrates another embodiment of the present invention which is similar to that illustrated in FIGS. 2A and 2B, except the parabolic reflective surface is incorporated into the capillary cap 14. Of course it is also conceived that a parabolic reflective surface may also be employed in connection with the extended capillary cap illustrated in FIGS. 1D and 1E.

Figure 3A:
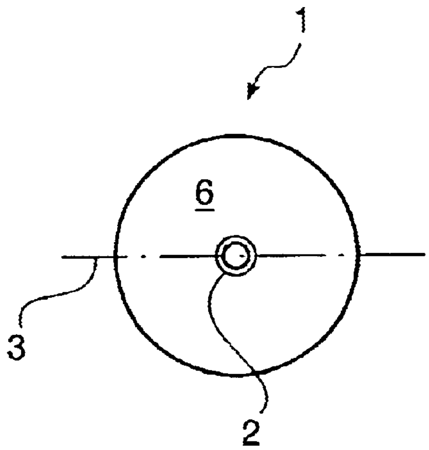
FIGS. 3A and 3B illustrate a device according to an example embodiment of the present invention having a conical reflective surface on an end of a capillary.
Figure 3B:
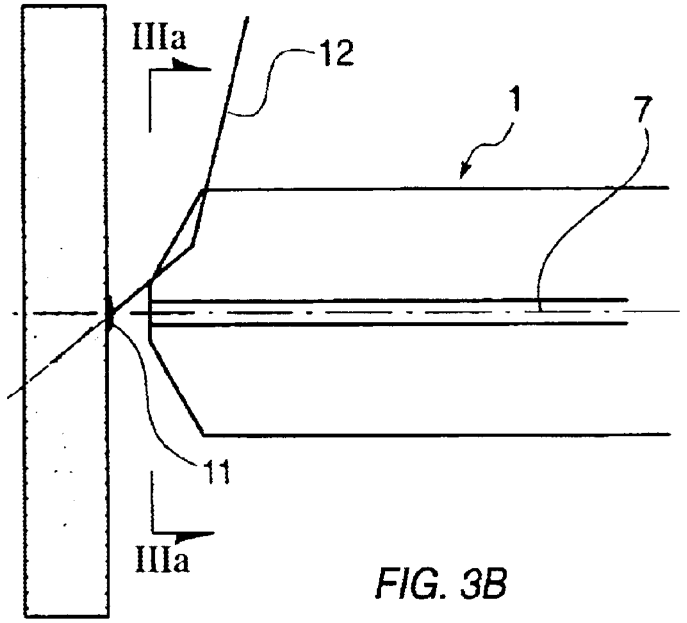

FIGS. 3A and 3B illustrate another example embodiment of the present invention FIG. 3B illustrates a side-view cross-sectional schematic representation of the capillary 1 with the capillary bore 7 The embodiment illustrated in FIG. 3B is similar to the embodiments illustrated in FIGS. 1B and 2B, except that the reflective surface 6 is conically shaped in FIG. 3B, as opposed to a flat surface in FIG. 1B and a parabolic surface in FIG. 2B. FIG. 3A illustrates an end-on view of the capillary 1 illustrated in FIG. 3B, taken along the lines 3*b*—3*b*. The capillary 1 is illustrated with the inlet orifice 2 and a center line 3. The embodiment illustrated in FIG. 3A is similar to the embodiments illustrated in FIGS. 1A and 2A, except that reflective surface 6 is conically shaped in FIG. 3A. A conically shaped mirror may allow more variation in the positioning of the laser to direct the laser beam to the target.

Figure 3C:
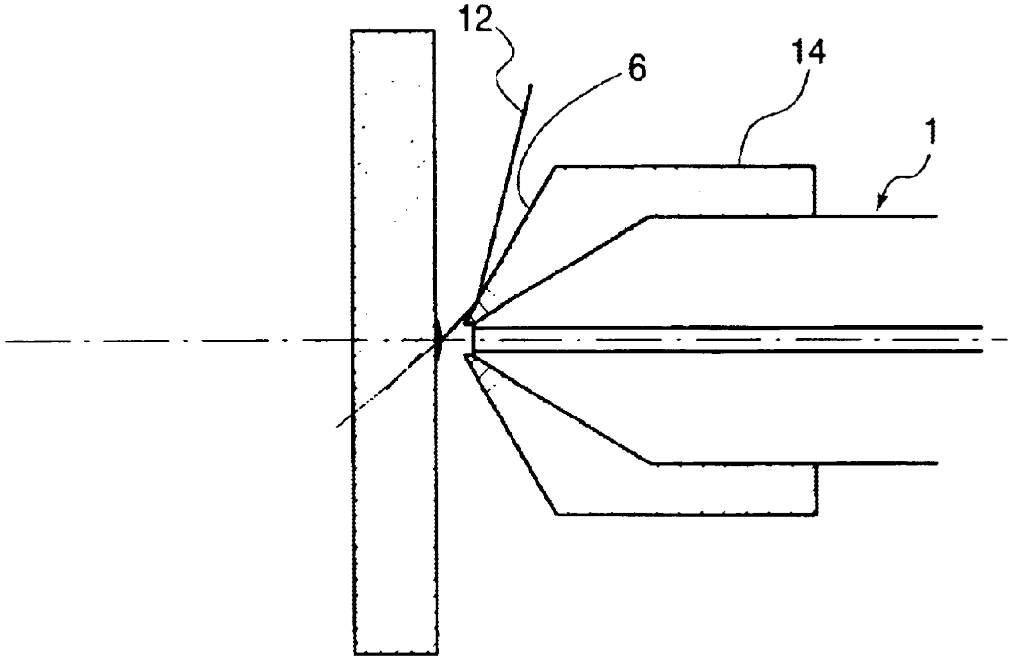
FIG. 3C illustrates a device according to an example embodiment of the present invention having a conical reflective surface on an end of a capillary cap.

FIG. 3C illustrates another example embodiment of the present invention. More specifically, FIG. 3C illustrates a side-view cross-sectional schematic representation of capillary 1 with the capillary bore 7. The embodiment illustrated in FIG. 3C is similar to the embodiments illustrated in FIGS. 1B and 2B, whereby a capillary cap 14 is disposed around the inlet orifice 2 of the capillary 1, except that the reflective surface 6 of the capillary cap 14 is conically shaped in FIG. 3C.

Figure 4:
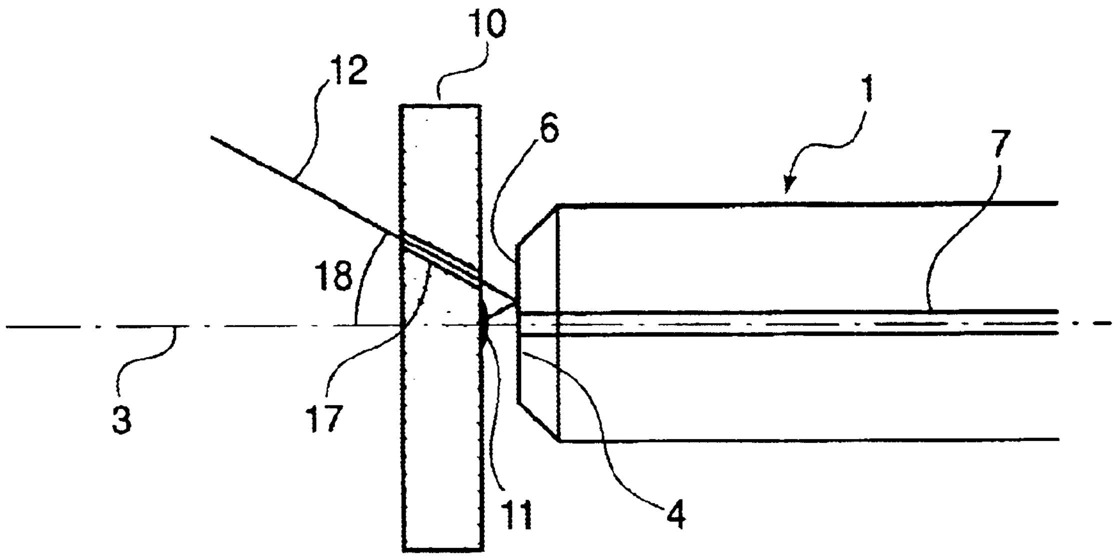
FIG. 4 illustrates a device according to an example embodiment of the present invention having a hole in the target substrate through which the laser beam travels.

FIG. 4 illustrates still another example embodiment of the present invention. Specifically, FIG. 4 illustrates the target substrate 10 with a substrate hole 17. The substrate hole 17 allows the laser beam 12 to pass through the target substrate 10, reflect off of the reflective surface 6, and impinge on the target 11. The reflective surface 6 may be, as shown in this example embodiment, a flat surface parallel to the target substrate 10. The reflective surface 6 may be a front face 4 provided with a reflective surface or coatings The hole angle arc 18 defines the angle between the substrate hole 17 and the center line 3 of the inlet orifice 2. In the embodiment shown, the hole angle arc corresponds to the angle of impingement of the laser beam 12 on the target 11.

Figure 5:
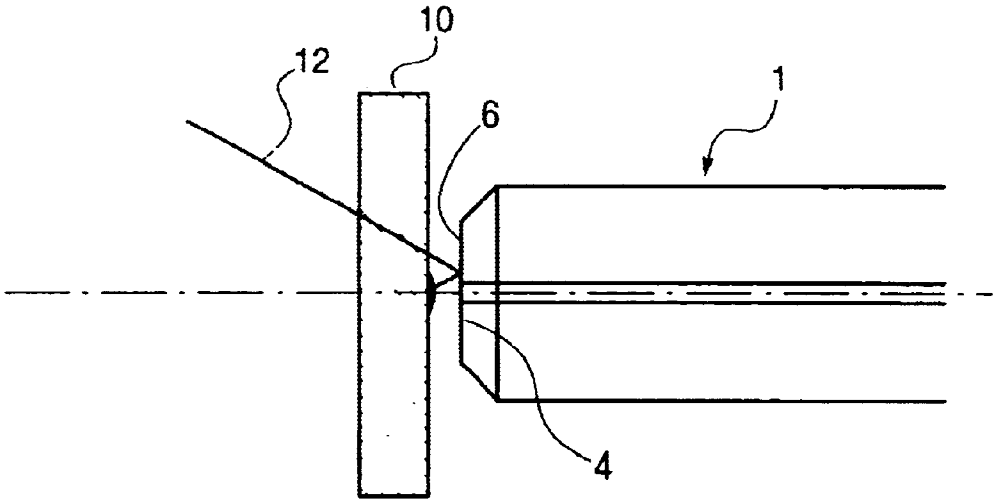
FIG. 5 illustrates a device according to an example embodiment of the present invention having a transparent substrate through which the laser beam travels.

FIG. 5 illustrates still another example embodiment of the present invention, in which the target substrate 10 is made of a UV transparent material. The UV transparent material may in a particular embodiment be quartz. Constructing the target substrate 10 of transparent material enables the laser beam 12 to be directed at the reflective surface 6 of the capillary 1 from various positions. In similar fashion to FIG. 4, the reflective surface 6 may be a front face 4 provided with a reflective surface or coating.

Figure 6:
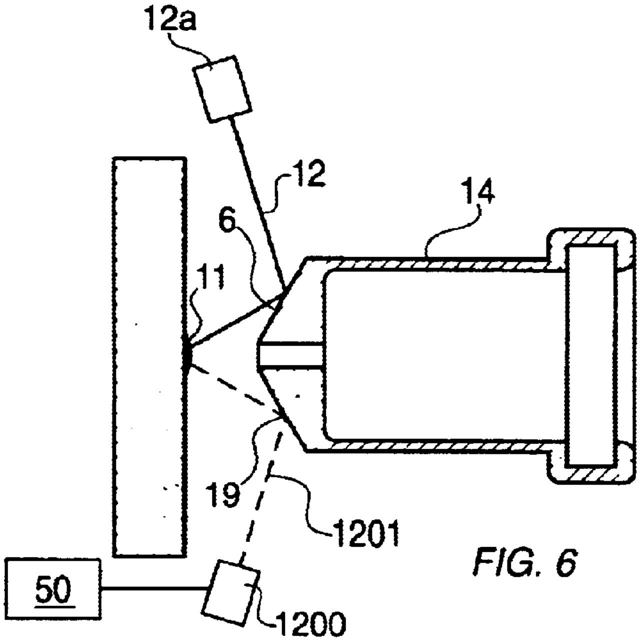
FIG. 6 illustrates a device according to an example embodiment of the present invention having a reflective surface disposed on a cap surrounding the capillary end and having another mirror on the cap for communication with a video system.

FIG. 6 illustrates still another example embodiment of the invention, in which the capillary cap 14 is provided with a reflective surface 6 similar to that shown in FIGS. 1D and 1E, but having an image mirror 19 provided on the capillary cap 14 on a side opposite the reflective surface 6. The image mirror 19 may be a flat mirror or any other reflective shape. According to one embodiment, the image mirror 19 may be used for a video system 1200 or any other type of imagine system, whereby the image mirror 19 reflects an image 1201 of the laser beam 12 impinging on the target 11 to the video system 1200. The image mirror 19 may therefore provide information enabling directional control of the laser 12*a* to improve the efficiency of the ionization of the target 11. An image 1201 of the laser beam 12 impinging on the target 11 obtained via image mirror 19 may be used by a human operator or a microprocessor to direct the laser at portions of the target 11 that have not been ionized. Alternatively, the image 1201 provided by image mirror 19 may allow a human operator or a microprocessor to actuate an x-y plane actuator (not shown) that moves the target substrate 10, and therefore the target 11, in an x-y plane defined as the plane perpendicular to the laser beam or to the central axis of the inlet orifice 2. Actuating an x-y plane actuator may allow movement of the target 11 relative to the laser beam 12 and to thereby enable a more complete ionization of the target 11. Another alternative embodiment provides the human operator or the microprocessor with control over movement of the target substrate 11 along a z-axis where the z-axis is defined as orthogonal to the x-y plane.

Figure 7:
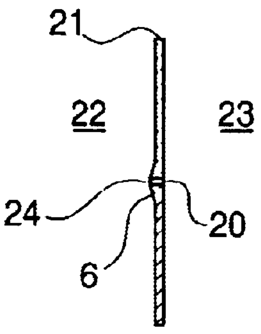
FIG. 7 illustrates a device according to an example embodiment of the present invention having a reflective shape on an area surrounding an orifice inlet.

As previously mentioned, the present invention may also be employed with inlet orifices that are not capillaries. FIG. 7 illustrates an orifice inlet 20 (also known as a pin hole inlet) in a barrier 21 of a mass spectrometer (not shown). The barrier 21 separates an atmospheric pressure side 22 from vacuum side 23. On the atmospheric pressure side 22, ions are produced by a laser beam (not shown) reflecting off a reflective surface 6 in order to ionize a target (not shown) which is positioned adjacent thereto. The ions desorbed from the target produce a plume which moves in the direction of the arrow 24 through the orifice inlet 20, due to the gas pressure differential across the barrier 21. The reflective surface 6 surrounds the orifice inlet 20 and extends toward the target and is formed in the embodiment shown by a change in thickness of barrier 21 The reflective surface 6 may therefore be formed by any appropriate deposition technique. The reflective surface 6 may be a flat mirror, a parabolic mirror, a conical mirror, or any other appropriate reflective shape. Additionally, the plane of ions may be accelerated in the direction of orifice inlet 20 by a DC bias voltage applied between barrier 21 and the target substrate (not shown).

Figure 8:
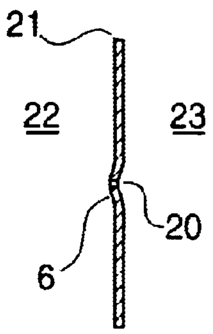
FIG. 8 illustrates a device according to another example embodiment of the present invention having a reflective surface on an area surrounding an orifice inlet.
Figure 9:
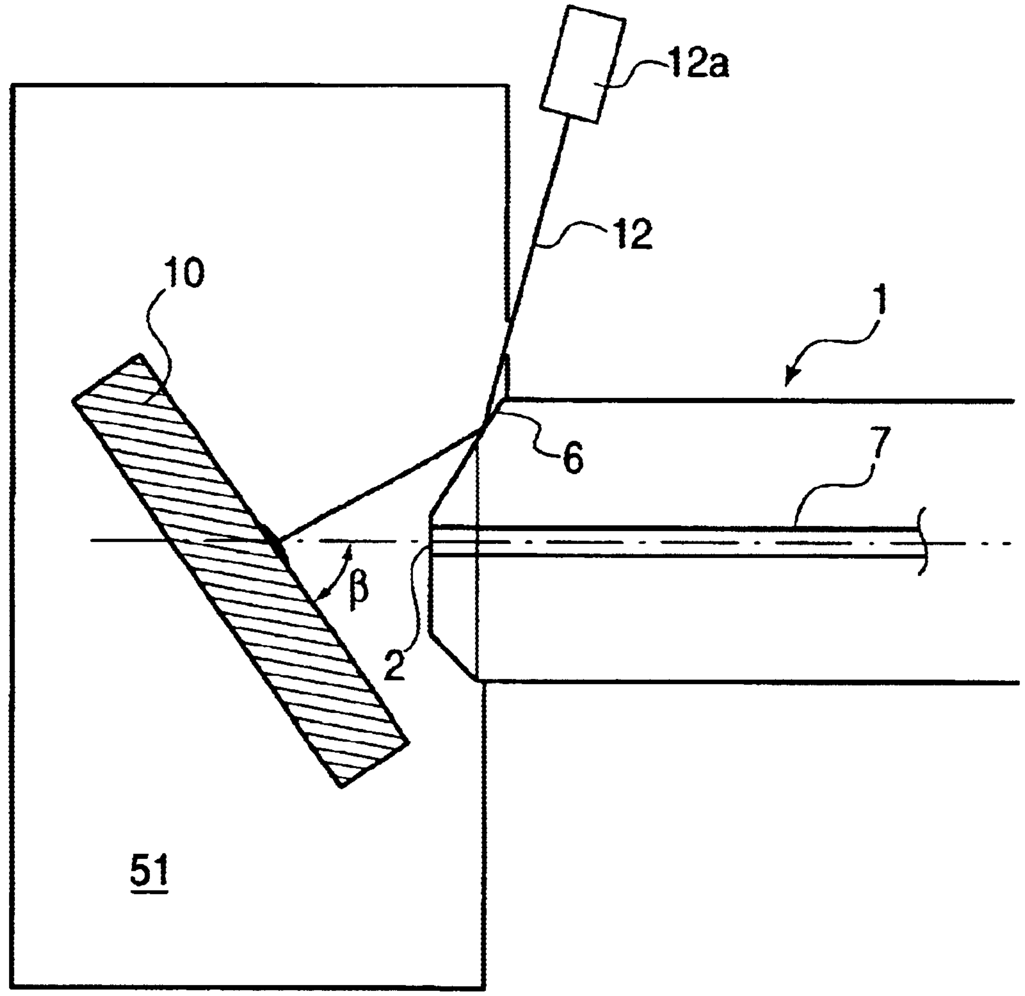
FIG. 9 illustrates a device according to another example embodiment of the present invention having a target substrate non-orthogonally positioned relative to a central axis of an orifice inlet.

FIG. 8 illustrates another exemplary embodiment of the present invention incorporated into an orifice inlet. The orifice inlet 20 is in the barrier 21 of a mass spectrometer. The reflective surface 6 surrounds the orifice inlet 20. In this embodiment, the reflective surface 6 is formed from the barrier 21 with no variation in thickness of the barrier 21. The reflective surface 6 is therefore formed by a deformation of barrier 21.

The present invention, in accordance with one embodiment thereof, also provides a method of using a device, such as the devices illustrated in FIGS. 1A through FIG. 8, in order to ionize a target in an AP-MALDI ionization arrangement. The method described hereinbelow provides one such method, according to one exemplary embodiment of the present invention. First, an analyte is initially embedded in a matrix of ultraviolet light absorbing material to form a target. The target and the capillary may be enclosed in an ionization chamber, and an inert gas, nitrogen, or air is injected into the ionization chamber. The capillary is positioned substantially orthogonal relative to the target. A laser beam is fired at the capillary such that the laser beam is reflected off of a reflective surface integral with the capillary and onto a target at an impingement angle as close as possible to 90 degrees. If the target is not completely ionized, the orientation of the laser is controlled by collecting an image from a second reflective surface using a video system which is monitored by a manual operator or a microprocessor. A gas flow of ionized molecules is then induced into the capillary from the ionization chamber by, for instance, a gas pressure differential between the ionization chamber and the opposite end of the capillary. If the device includes a mass spectrometer, then a mass spectrum of the ionized molecules is obtained. If not, the ions are simply detected without any further mass separation. Of course, various different methods may be employed depending on, for example, which of the devices illustrated in FIGS. 1A to 9 are used to ionize the target.

As previously mentioned, the present invention, according to various embodiments discussed below and illustrated in FIGS. 1A to 9, seek to optimize the efficiency at which ions are produced and collected in an AP-MALDI apparatus. In doing so, these various embodiments take into account the various size and geometrical constraints that are typically imposed on an AP-MALDI apparatus. More specifically, it is typically desired that an AP-MALDI apparatus require as little space as possible, which limits the size of the components of the apparatus, as well as limits the relative geometry, e.g., the location and configurations, of the various components of the apparatus.

Keeping these size and geometric limitations in mind, there are several factors which may improve the ion production and collection efficiency of an AP-MALDI apparatus. To varying degrees, the embodiments of the present invention illustrated and discussed herein seek to maximize the ion production and collection efficiency of the apparatus by simultaneously optimizing these factors. Some of these factors, each of which is further clarified below, are:

1) maintaining the laser beam as close to orthogonal as possible relative to the target substrate;
2) maintaining the target substrate having the sample disposed thereon as close as possible to the inlet orifice of the spectrometer, and
3) maintaining the target substrate as close to orthogonal as possible relative to the central axis of the inlet orifice of the spectrometer.

For instance, it is preferable that the laser beam be maintained as close to orthogonal as possible relative to the target substrate. By maintaining the laser bcam 12 as close to orthogonal as possible relative to the target substrate 10, the production of ions from target 11 may be improved. For instance, optimal heating of the target 11 may be achieved when the laser beam 12 impinges the target 11 on target substrate 10 orthogonally. Since the desorption of the target 11 is caused by heating the target 11 while on the target substrate 10, it follows that the rate of desorption of the target 11 is maximized, and thus the production of ionized analyte molecules therefrom is maximized, when the laser beam 12 impinges the target 11 on target substrate 10 orthogonally.

It is also preferable that the target substrate having the sample disposed thereon be maintained as close as possible to the inlet orifice of the spectrometer. By maintaining the taret substrate 10, and the target 11 disposed thereon, as close as possible to the inlet orifice 2 of the spectrometer, the collection efficiency may be improved by virtue of the relatively small distance that is required to be traveled by the ions in order to enter the inlet orifice 2. For instance, the figures generally assume a target placed approximately 1 millimeter from the capillary entrance, though distances in the range of 3 to 5 millimeters may also be employed. Though smaller and greater distances may also be possible, this small distance requires the desorbed ions to travel a very short distance to the inlet orifice 2.

It is also preferable that the target substrate be maintained as close to orthogonal as possible relative to the central axis of the inlet orifice of the spectrometer. By maintaining the target substrate 10 as close to orthogonal as possible relative to the central axis of the inlet orifice 2, the collection of ions from target 11 may be improved. For instance, ions that are desorbed from the target substrate 10 may be likeliest to travel in a direction that is orthogonal to the target substrate 10.

It is noted that the three above-stated factors may be, in some instances, countervailing. Generally, as the distance between the target 11 and the inlet orifice 2 is increased, the angle of impingement of the laser beam on the target may be increased closer to orthogonal. Thus, an increase in the relative ion production efficiency which is experienced by increasing the distance between the target and the inlet orifice may result in a decrease in the relative ion collection efficiency. Likewise, a decrease in the relative ion production efficiency which is experienced by decreasing the distance between the target and the inlet orifice may result in an increase in the relative ion collection efficiency. One of the advantages that may be provided by the embodiments of the present invention is that they more nearly optimize the production and collection efficiencies despite these countervailing considerations. Even when the target 1 is very close to the inlet orifice 2, the angle of impingement of the laser beam on the target 11 is relative close to being orthogonal. Furthermore the distance that the target 11 is required to be moved away from the inlet orifice 2 in order to achieve a substantially orthogonal angle of impingement is relatively small.

Figure 10:
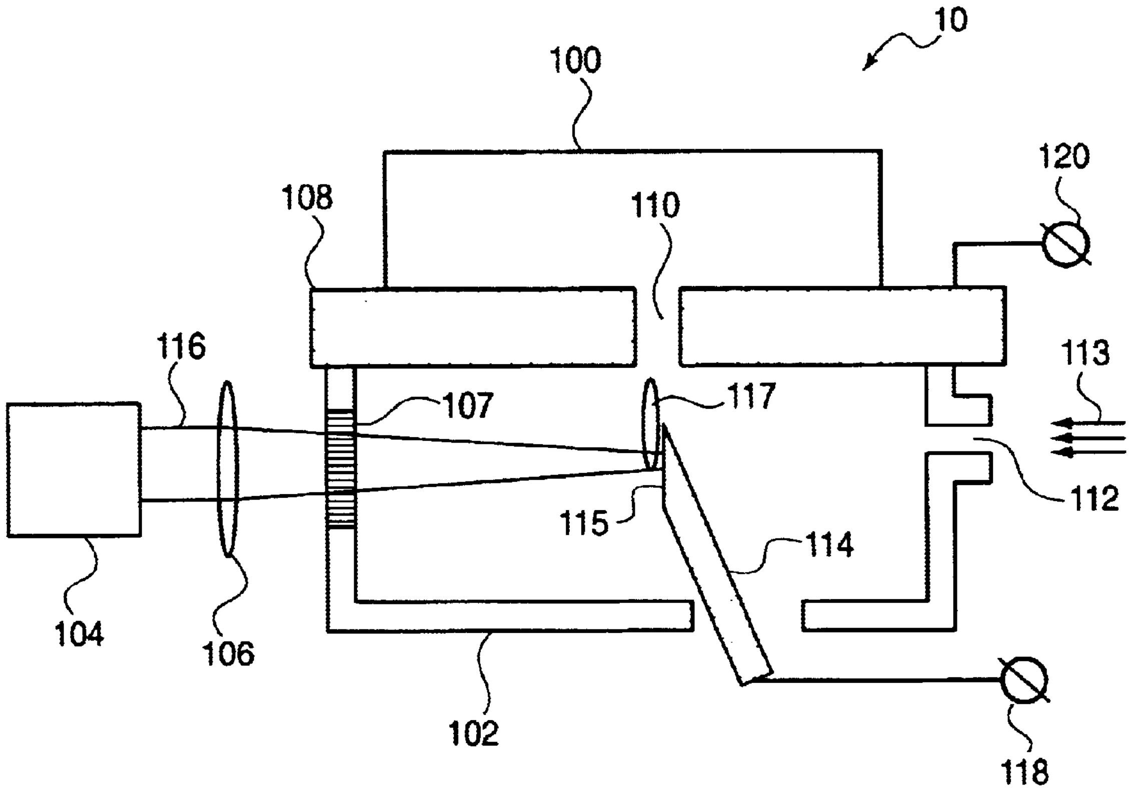
FIG. 10 (Prior Art)
FIG. 10 illustrates a conventional AP-MALDI apparatus according to the prior art.

Conventional AP-MALDI ionization sources do not provide all of the advantages discussed above. Instead, they typically seek to provide improved production or the collection efficiencies of the apparatus, but not both simultaneously. For instance, the AP-MALDI apparatus illustrated in FIG. 10 discloses a target substrate which is orthogonal to the laser beam at the point of impingement, which may provide maximum desorption of the sample. However, in order to maintain the laser beam orthogonal to the target substrate, the apparatus also maintains the target substrate parallel to the central axis of the inlet orifice, which may result in a less-than-optional ion collection efficiency of the apparatus.

Figure 11:
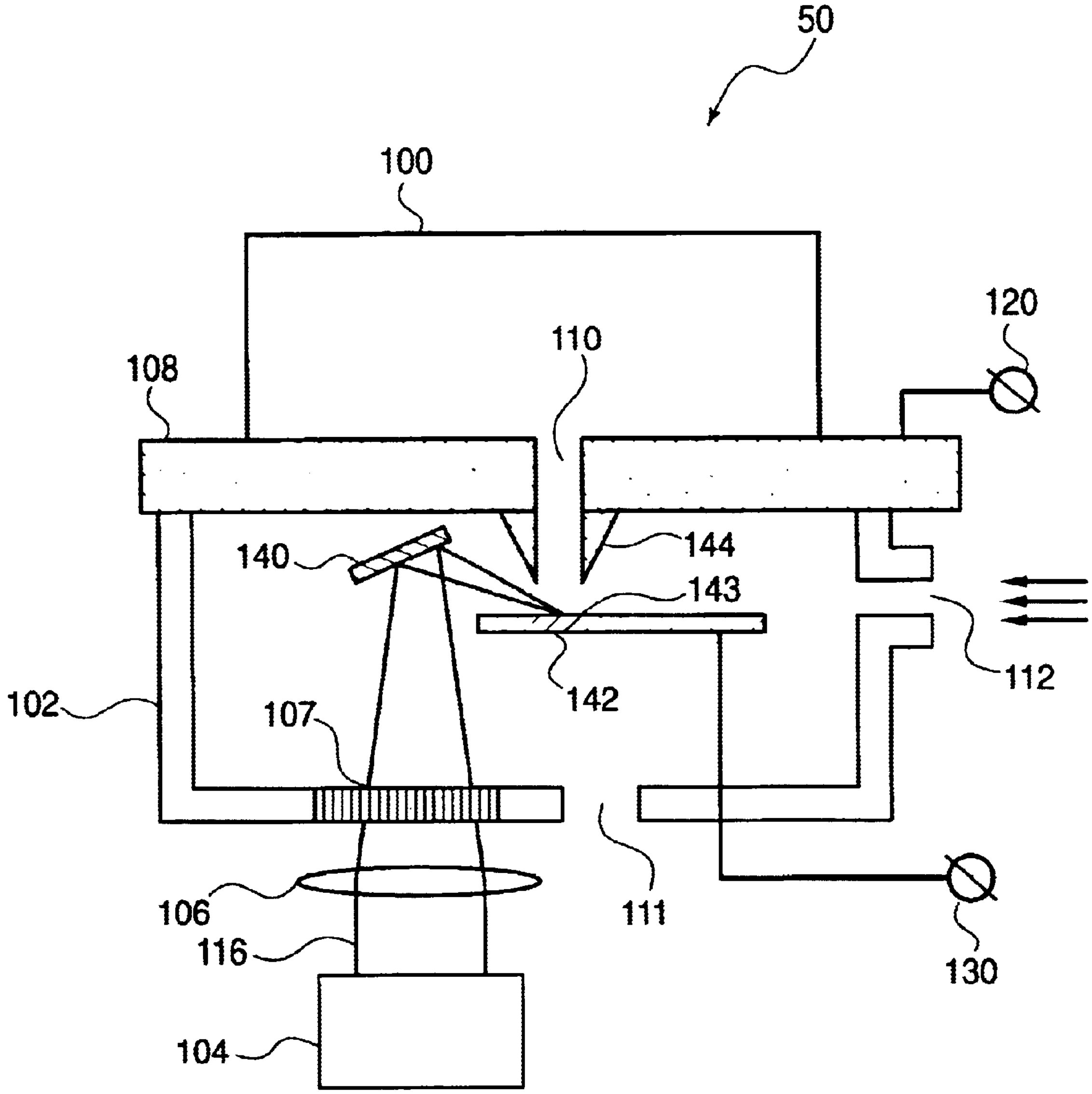
FIG. 11 (Prior Art)
FIG. 11 illustrates another conventional AP-MALDI apparatus according to the prior art.

Similarly, the AP-MALDI apparatus illustrated in FIG. 11 discloses a target substrate which is orthogonal to the central axis of the inlet orifice. However, according to this configuration, the target substrate is required to be a substantial distance from the inlet orifice, because there must be a sufficient amount of space for the mirror to reflect the laser beam back onto the target substrate. Furthermore, even when the target substrate is moved a sufficient distance from the inlet orifice, the laser beam does not impinge the target substrate at an angle which is even close to orthogonal. At the considerable distance shown in FIG. 11, the angle of impingement of the laser beam on the target substrate is very small and the ion production efficiency is therefore substantially less than optimal. In order to obtain an angle of impingement which is close to being orthogonal, the target substrate would need to be moved away from the inlet orifice to such a considerable distance that the collection efficiency would suffer greatly. Thus, the configurations illustrated in the Laiko patent fail to simultaneously satisfy all of the criteria indicated above to a satisfactory degree, particularly in light of the size and geometric constraints that limit these devices.

The present invention, in accordance with various embodiments thereof, also provides numerous additional advantages over the conventional AP-MALDI apparatuses. For instance, the relative close proximity of the reflective surface 6 to the target 11, and from the target 11 to the inlet orifice 2, provides a more predictable positioning of the laser beam on the sample. This follows because the short distances required to be traveled by the laser beam in the example embodiments of the present invention provides less optical leverage than the longer distances required to be traveled by the laser beams in the conventional AP-MALDI apparatuses. In other words, in the AP-MALDI apparatus of the present invention, a small change in the direction of the laser beam or in the orientation of the reflective surface results in a relatively small change in the location at which the laser beam impinges the target substrate. By contrast, in a conventional AP-MALDI apparatus like the one illustrated in FIG. 11, a small change in the direction of the laser beam or in the orientation of the reflective surface results in a relatively large change in the location at which the laser beam impinges the target substrate. Thus, the present invention in accordance with various embodiments thereof, reduces the need to adjust the mirror orientation in order to strike the target.

In addition to reducing the need to adjust the orientation of the mirror, the present invention, in accordance with various embodiments thereof, reduces the need to adjust the position of the reflective surface in order to strike the target. For instance, the AP-MALDI apparatus of the present invention, in accordance with various embodiments thereof, may employ robotics or the like to move the target substrate to various positions relative to the inlet orifice of the mass spectrometer, as described previously. In this manner, numerous samples may be disposed on a target substrate, and may be consecutively analyzed by the AP-MALDI apparatus, which significantly improves the throughput of the apparatus compared to target substrates that only have disposed thereon a single sample. Each of the embodiments of the present invention enable the laser beam to impinge on a target, regardless of the position of the target on the target substrate, without needing to change the position of the reflective surface.

By contrast, for conventional AP-MALDI apparatuses that employ robotics or the like to move the target substrate to various positions relative to the inlet orifice of the mass spectrometer, it is typically necessary for the position of the reflective surface, as well as the orientation of the laser, to be adjusted For instance, the conventional AP-MALDI apparatus that is illustrated in FIG. 11 shows mirror 140 reflecting the laser beam onto a target 143 near the left side of the target substrate 142. If a target on the right side of the target substrate is desired to be analyzed, the target substrate 142 may be moved to the left. However, when the target substrate is moved into this position, e.g., with a target on the right side of the target substrate positioned directly in front of the inlet orifice, the left side of the target substrate is disposed between the laser 104 and the mirror surface 140, thereby blocking the path of the laser beam. In order to avoid blocking the path of the laser beam, the position of the mirror surface must be adjusted, as well as the orientation of the laser beam. The need to provide adjustability to the position of the mirror surface and to the orientation of the laser beam increases the sophistication and the cost of the AP-MALDI apparatus. It is also noted that the apparatus of the present invention, as described herein, is readily compatible with the robotics and other control mechanisms which are conventionally employed to operate and adjust the apparatus.

Thus, the several aforementioned features and advantages of the present invention are most effectively attained. Those skilled in the art will appreciate that numerous modifications of the exemplary embodiments described hereinabove may be made without departing from the spirit and scope of the invention. Although several exemplary embodiments of the present invention have been described and disclosed in detail herein, it should be understood that this invention is in no sense limited thereby and that its scope is to be determined by that of the appended claims.

What is claimed is:

1. An apparatus for ionizing a target for analysis in a mass analyzer, said apparatus comprising:

a target substrate having a target disposed thereon;

a laser beam;

an interface adjacent to the target substrate that divides a region containing the target substrate from a region of lower pressure containing the mass analyzer, and having an inlet orifice leading to the mass analyzer; and a reflective surface integral with the interface, wherein the reflective surface reflects the laser beam toward the target.

2. The apparatus according to claim 1, wherein said target substrate is at about atmospheric pressure.

3. The apparatus according to claim 1, wherein said target substrate is below atmospheric pressure.

4. The apparatus according to claim 1, wherein said target substrate is above atmospheric pressure.

5. The apparatus according to claim 1, further comprising a chamber within which the target substrate is disposed.

6. The apparatus according to claim 1, wherein the interface comprises a capillary.

7. The apparatus according to claim 6, wherein the reflective surface is disposed on an end of the capillary.

8. The apparatus according to claim 6, wherein the interface comprises a cap configured to fit on an end of the capillary.

9. The apparatus according to claim 8, wherein the reflecting surface is disposed on the cap.

10. The apparatus according to claim 8, wherein the end of the capillary is shaped, and the cap is configured and arranged so as to fit on the shaped end of the capillary.

11. The apparatus according to claim 1, wherein the inlet orifice has a central axis and the target substrate is substantially orthogonal to the central axis of the inlet orifice.

12. The apparatus according to claim 1, wherein the inlet orifice has a central axis and the target substrate is tilted at an angle of between 45 degrees and 135 degrees relative to said central axis.

13. The apparatus according to claim 1, Wherein the laser beam impinges the target substrate at an angle that is substantially orthogonal to the target substrate.

14. The apparatus according to claim 1, wherein the target substrate has at least two targets disposed thereupon.

15. The apparatus according to claim 1, further comprising:

a processor; and a video system for providing video data to the processor, wherein the video data relates to a position of the target and an impingement of the laser, beam thereto.

16. The apparatus according to claim 15, further comprising an adjustment mechanism coupled to the target substrate and to the processor, and configured to adjust the position of the target substrate in response to a signal received from the processor.

17. The apparatus according to claim 15, further comprising an adjustment mechanism coupled to a source of the laser beam and to the processor, and configured to adjust a position of the laser beam in response to a signal received from the processor.

18. The apparatus according to claim 1, wherein the reflective surface is flat.

19. The apparatus according to claim 1, wherein the reflective surface is parabolic.

20. The apparatus according to claim 1, wherein the target substrate defines an orifice through which the laser beam travels prior to being reflected off the reflective surface and onto the target.

21. The apparatus according to claim 1, wherein the target substrate comprises a UV transparent material, and wherein the laser beam travels through the target substrate prior to being reflected off the reflective surface and onto the target.

22. The apparatus according to claim 1, wherein the reflective surface comprises a stainless steel surface.

23. The apparatus according to claim 1, wherein the reflective surface comprises a dielectric mirror surface.

24. The apparatus according to claim 6, wherein the capillary comprises a dielectric material.

25. The apparatus according to claim 6, wherein the capillary comprises glass.

26. The apparatus according to claim 1, wherein the target substrate comprises quartz.

27. A method for ionizing a target for analysis in a mass analyzer, the mass analyzer having an interface adjacent to the target that divides a region containing the target from a region of lower pressure containing the mass analyzer and that defines an inlet orifice of the mass analyzer, the method comprising:

reflecting a laser beam off a reflective surface integral with the interface; and irradiating the target with the laser beam after reflection.

28. The method according, to claim 27, further comprising:

maintaining a chamber containing the target at about atmospheric pressure.

29. The method according to claim 27, further comprising:

maintaining a chamber containing the target at less than atmospheric pressure.

30. The method according to claim 27, wherein the target is disposed on a target substrate, further comprising:

controllably adjusting a position of the target substrate with respect to the reflected laser beam.

31. The method according to claim 27, wherein the target is disposed on a target substrate, further comprising:

positioning the target substrate so as to be substantially orthogonal to a central axis of the inlet orifice.

32. The method according to claim 27, wherein the target is disposed on a target substrate, further comprising:

positioning the target substrate with respect to the reflected laser beam in response to a signal from a processor.

33. The method according to claim 27, wherein the target is disposed on a target substrate, and wherein the step of irradiating the target includes striking the target with the laser beam such that said laser beam is substantially orthogonal to said target substrate when it strikes the target.

34. The method according to claim 27, further comprising generating video data with a video system; and sending the video data to a processor;

wherein the video data relates to a position of the target and an impingement of the laser beam relative thereto.

35. The method according to claim 34, further comprising:

adjusting a position of the target substrate in response to a signal from the processor.

36. The method according to claim 34, further comprising:

adjusting a position of the laser beam in response to a signal from the processor.

37. The method according to claim 27, wherein the target is disposed on a target substrate, further comprising:

directing the laser beam through an orifice in the target substrate prior to the laser beam being reflected off the reflective surface.

38. The method according to claim 27, wherein the target is disposed on a target substrate, further comprising:

directing the laser beam through a UV transparent material in the target substrate prior to the laser beam being reflected off the reflective surface.

39. An apparatus for ionizing a target in an atmospheric pressure MALDI ion source comprising:

a target substrate situated in a first region at atmospheric pressure;

an interface adjacent to the target substrate dividing the first region from a second region at sub-atmospheric pressure, the interface including an inlet orifice leading from the first region to the second region;

a reflective surface integral with the interface, configured to reflect laser radiation directed initially onto the surface toward the target substrate.

40. The apparatus of claim 39, wherein the second region contains a mass analyzer.

41. The apparatus of claim 39, wherein the second region is maintained at high vacuum pressure.

42. The apparatus of claim 39, wherein the interface comprises a capillary.

43. The apparatus of claim 42, wherein the reflective surface is disposed on an end of the capillary.

44. The apparatus of claim 39, wherein the inlet orifice has a central axis and the target substrate is tilted at an angle of between 45 and 135 degrees relative to the central axis.

* * * * *